US012668053B2

(12) United States Patent
Usumoto

(10) Patent No.: US 12,668,053 B2
(45) Date of Patent: Jun. 30, 2026

(54) PRINTING APPARATUS AND MANAGEMENT METHOD

(71) Applicant: SCREEN Holdings Co., Ltd., Kyoto (JP)

(72) Inventor: Hiroaki Usumoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 135 days.

(21) Appl. No.: 18/701,386

(22) PCT Filed: Oct. 3, 2022

(86) PCT No.: PCT/JP2022/036952
§ 371 (c)(1),
(2) Date: Apr. 15, 2024

(87) PCT Pub. No.: WO2023/068026
PCT Pub. Date: Apr. 27, 2023

(65) Prior Publication Data
US 2024/0416647 A1 Dec. 19, 2024

(30) Foreign Application Priority Data
Oct. 21, 2021 (JP) ................................ 2021-172224

(51) Int. Cl.
*B41J 2/045* (2006.01)
*B41J 11/00* (2006.01)
(Continued)

(52) U.S. Cl.
CPC ....... *B41J 2/04505* (2013.01); *B41J 11/0095* (2013.01); *B41J 15/048* (2013.01); *B41J 15/16* (2013.01); *B41J 29/393* (2013.01)

(58) Field of Classification Search
CPC .. B41J 2/04505; B41J 11/0095; B41J 15/048; B41J 15/16; B41J 15/393
See application file for complete search history.

(56) References Cited

U.S. PATENT DOCUMENTS

2012/0113176 A1 5/2012 Folkins et al.
2015/0306870 A1 10/2015 Sumiyoshi
(Continued)

FOREIGN PATENT DOCUMENTS

CN 102555507 A 7/2012
JP 2009-211472 A 9/2009
(Continued)

OTHER PUBLICATIONS

International Search Report received in PCT Application No. PCT/JP2022/036952 dated Nov. 8, 2022, w/ English Translation.
(Continued)

*Primary Examiner* — Jason S Uhlenhake
(74) *Attorney, Agent, or Firm* — Rimon P.C.

(57) ABSTRACT

A technique provided herein makes it possible to select a measurement place to be adjusted from a plurality of measurement places in a printing apparatus if a misregistration amount deviates from a permissible range. The printing apparatus comprises a controller including a detection part, a causality search part, and a selection part. The detection part detects the amount of mutual misalignment between inks ejected from a plurality of heads to a surface of a base material on the basis of a captured image acquired from a camera. The causality search part acquires measured values from a plurality of sensors and acquires the misalignment amount from the detection part. The causality search part estimates a causal relationship between observed variables using a plurality of the measured values and the misalignment amount as the observed variables and using a statistical causality search program, and calculates a strength of the causal relationship between the observed variables. The selection part selects a measurement place to be adjusted on the basis of a plurality of the strengths if the misalignment amount deviates from a permissible range.

12 Claims, 7 Drawing Sheets

(51) Int. Cl.

| | |
|---|---|
| ***B41J 15/04*** | (2006.01) |
| ***B41J 15/16*** | (2006.01) |
| ***B41J 29/393*** | (2006.01) |

(56) References Cited

U.S. PATENT DOCUMENTS

| | | | |
|---|---|---|---|
| 2016/0075155 A1 | 3/2016 | Fukui et al. | |
| 2019/0324833 A1 | 10/2019 | Kobayashi et al. | |
| 2020/0192342 A1 | 6/2020 | Fujitsuka | |

FOREIGN PATENT DOCUMENTS

| | | | | |
|---|---|---|---|---|
| JP | 2016-055570 | A | | 4/2016 |
| JP | 2019-192965 | A | | 10/2019 |
| JP | 2021-146510 | A | | 9/2021 |
| JP | 2021149148 | A | * | 9/2021 |
| WO | 2018/198267 | A1 | | 11/2018 |

OTHER PUBLICATIONS

Search Report received in the corresponding Taiwanese Application No. 111138733, dated Jul. 11, 2023.

* cited by examiner

PRINTING APPARATUS AND MANAGEMENT METHOD

CROSS-REFERENCE TO RELATED APPLICATIONS

This application is the U.S. National Phase under 35 U.S.C. § 371 of International Application No. PCT/JP2022/036952, filed on Oct. 3, 2022, which claims the benefit of foreign priority to JP Patent Application No. 2021-172224 filed on Oct. 21, 2021, and the entire contents of each of which are hereby incorporated by reference.

TECHNICAL FIELD

The present invention relates to a printing technique of ejecting inks to a surface of an elongated strip-shaped base material from a plurality of heads while transporting the base material in a longitudinal direction thereof along a predetermined transport path.

BACKGROUND ART

An inkjet printing apparatus conventionally known prints an image on an elongated strip-shaped base material by ejecting inks from a plurality of heads while transporting the base material in a longitudinal direction thereof. The inkjet printing apparatus ejects inks of respective different colors from the plurality of heads. Then, single-color images formed using the respective inks are superimposed on each other to print a multi-color image on a surface of the base material. The conventional printing apparatus is described in Patent Literature 1, for example.

CITATION LIST

Patent Literature

Patent Literature 1: Japanese Patent Application Laid-Open No. 2016-055570

SUMMARY OF INVENTION

Technical Problem

In a printing apparatus of this type, slight misalignment (what is called "misregistration") may occur between a plurality of the above-described single-color images. The misregistration results from various causes such as rotation error of a roller for transporting the base material, a torque of a motor, expansion/contraction of the base material, and vertical displacement of the base material. This makes it extremely difficult to identify a place to be adjusted in response to deviation of the misregistration amount from a permissible range.

The present invention has been made in view of the foregoing circumstances, and is intended to provide a technique by which it is possible to select a measurement place to be adjusted from a plurality of measurement places in a printing apparatus if a misregistration amount deviates from a permissible range.

Solution to Problem

To solve the problem described above, a first invention of the present application is intended for a printing apparatus comprising: a transport mechanism for transporting an elongated strip-shaped base material in a longitudinal direction of the base material along a predetermined transport path; a plurality of heads for ejecting inks to a surface of the base material transported by the transport mechanism; a plurality of sensors for measuring states at a plurality of measurement places in the apparatus; a camera for capturing an image of the surface of the base material on a downstream side of the transport path from the plurality of heads; and a controller communicably connected to the plurality of sensors and the camera. The controller includes: a detection part that detects the amount of mutual misalignment between the inks ejected from the plurality of heads to the surface of the base material on the basis of a captured image acquired from the camera; a causality search part that acquires measured values from the plurality of sensors and acquires the misalignment amount from the detection part, estimates a causal relationship between observed variables using a plurality of the measured values and the misalignment amount as the observed variables and using the statistical causality search program, and calculates a strength of the causal relationship between the observed variables; and a selection part that selects a measurement place to be adjusted from the plurality of measurement places on the basis of a plurality of the strengths if the misalignment amount deviates from a permissible range.

According to a second invention of the present application, in the printing apparatus of the first invention, the controller further includes an input part that accepts input of a selection criterion, and the selection part selects a measurement place to be adjusted on the basis of a plurality of the strengths and the selection criterion input through the input part.

According to a third invention of the present application, in the printing apparatus of the first or second invention, the plurality of measurement places includes: a first measurement place that directly impacts on the misalignment amount; and a second measurement place that impacts on the misalignment amount indirectly across the first measurement place, and the selection part selects the first measurement place as a measurement place to be adjusted preferentially to the second measurement place.

According to a fourth invention of the present application, in the printing apparatus of the first or second invention, the plurality of measurement places includes: a third measurement place that does not necessitate change of a part for adjustment; and a fourth measurement place that necessitates change of a part for adjustment, and the selection part selects the third measurement place as a measurement place to be adjusted preferentially to the fourth measurement place.

According to a fifth invention of the present application, in the printing apparatus of the fourth invention, the controller further includes an adjustment part that adjusts the third measurement place automatically if the selection part selects the third measurement place.

According to a sixth invention of the present application, in the printing apparatus of any one of the first to fifth inventions, the causality search part calculates an impact value about each of the measurement places on the basis of a plurality of the strengths, the impact value indicating a degree of an impact by the measured value on the misalignment amount, and if the misalignment amount deviates from the permissible range, the selection part selects a measurement place where the impact value is greater than a threshold as a measurement place to be adjusted from the plurality of measurement places.

According to a seventh invention of the present application, in the printing apparatus of any one of the first to fifth inventions, if the misalignment amount deviates from the permissible range, the selection part selects a measurement place where the strength changes to an amount or changes at a rate greater than a threshold as a measurement place to be adjusted from the plurality of measurement places.

An eighth invention of the present application is intended for a management method of managing a printing apparatus that ejects inks to a surface of an elongated strip-shaped base material from a plurality of heads while transporting the base material in a longitudinal direction of the base material along a predetermined transport path. The method comprises: a) a step of measuring states at a plurality of measurement places in the printing apparatus; b) a step of detecting the amount of mutual misalignment between the inks ejected from the plurality of heads to the surface of the base material; c) a step of estimating a causal relationship between observed variables using a plurality of measured values acquired in the step a) and the misalignment amount detected in the step b) as the observed variables and using a statistical causality search program, and calculating a strength of the causal relationship between the observed variables; and d) a step of selecting a measurement place to be adjusted from the plurality of measurement places on the basis of a plurality of the strengths if the misalignment amount deviates from a permissible range.

According to a ninth invention of the present application, in the management method of the eighth invention, in the step d), a measurement place to be adjusted is selected on the basis of a plurality of the strengths and a selection criterion input by a user.

According to a tenth invention of the present application, in the management method of the eighth or ninth invention, the plurality of measurement places includes: a first measurement place that directly impacts on the misalignment amount; and a second measurement place that impacts on the misalignment amount indirectly across the first measurement place, and in the step d), the first measurement place is selected as a measurement place to be adjusted preferentially to the second measurement place.

According to an eleventh invention of the present application, in the management method of the eighth or ninth invention, the plurality of measurement places includes: a third measurement place that does not necessitate change of a part for adjustment; and a fourth measurement place that necessitates change of a part for adjustment, and in the step d), the third measurement place is selected as a measurement place to be adjusted preferentially to the fourth measurement place.

According to a twelfth invention of the present application, in the management method of the eleventh invention, the method further comprises: e) a step of causing the printing apparatus to adjust the third measurement place automatically if the third measurement place is selected in the step d).

According to a thirteenth invention of the present application, in the management method of any one of the eighth to twelfth inventions, in the step c), an impact value about each of the measurement places is calculated on the basis of a plurality of the strengths, the impact value indicating a degree of an impact by the measured value on the misalignment amount, and in the step d), if the misalignment amount deviates from the permissible range, a measurement place where the impact value is greater than a threshold is selected as a measurement place to be adjusted from the plurality of measurement places.

According to a fourteenth invention of the present application, in the management method of any one of the eighth to twelfth inventions, in the step d), if the misalignment amount deviates from the permissible range, a measurement place where the strength changes to an amount or changes at a rate greater than a threshold is selected as a measurement place to be adjusted from the plurality of measurement places.

Advantageous Effects of Invention

According to the first to fourteenth inventions of the present application, it is possible to select a measurement place to be adjusted from the plurality of measurement places in the printing apparatus on the basis of the strength of the causal relationship between the plurality of observed variables.

In particular, according to the second and ninth inventions of the present application, it is possible to select a measurement place to be adjusted on the basis of the selection criterion designated by a user.

In particular, according to the third and tenth inventions of the present application, it is possible to reduce the misalignment amount by adjusting the first measurement place without adjusting the second measurement place.

In particular, according to the fourth and eleventh inventions of the present application, it is possible to reduce the misalignment amount by adjusting the third measurement place without changing a part at the fourth measurement place. This allows the printing apparatus to be used continuously while controlling the misalignment amount within the permissible range without stopping the printing apparatus.

In particular, according to the fifth and twelfth inventions of the present application, it is possible to adjust the third measurement place automatically if the third measurement place is selected.

DESCRIPTION OF EMBODIMENTS

An embodiment of the present invention will now be described with reference to the drawings.

<1. Configuration of Printing Apparatus>

Figure 1:
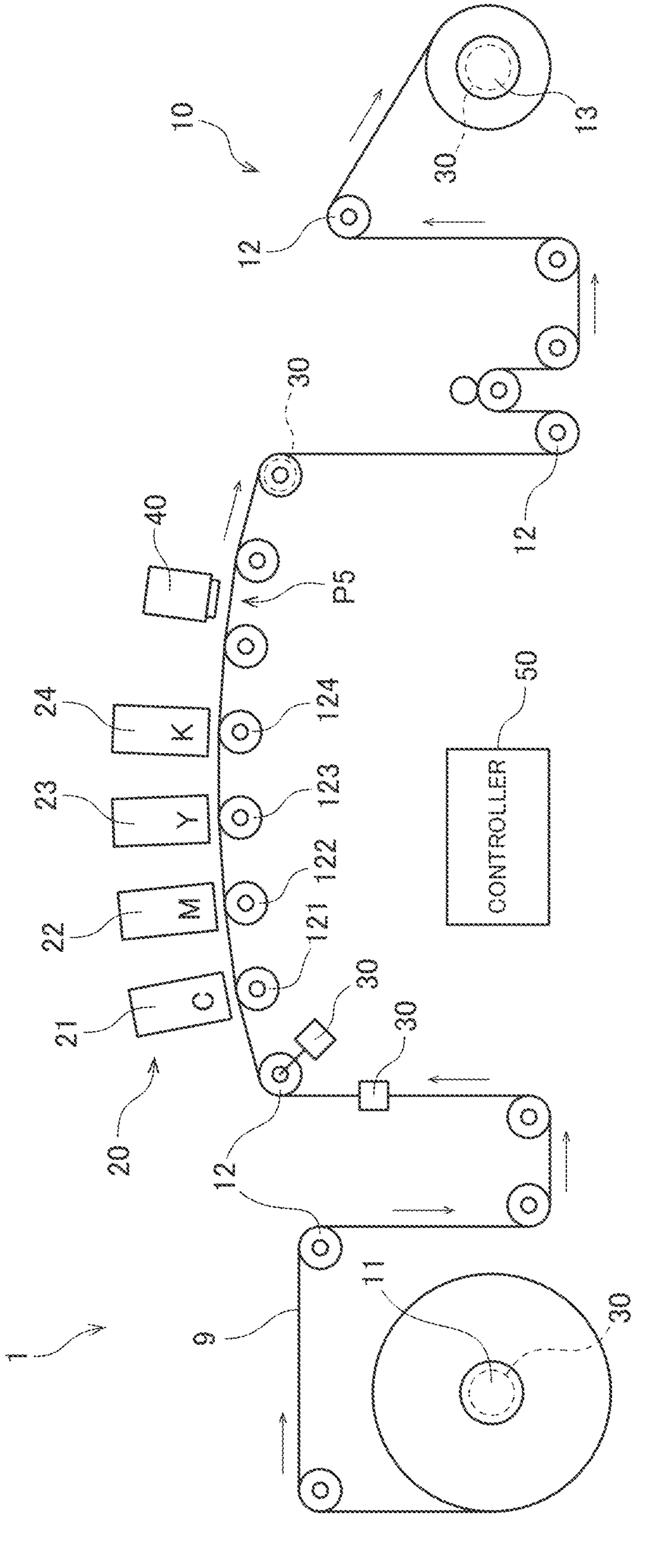
FIG. 1 is a view showing the configuration of a printing apparatus.

FIG. 1 is a view showing the configuration of a printing apparatus 1 according to one embodiment of the present invention. The printing apparatus 1 is an apparatus that prints an image on a surface of an elongated strip-shaped base material 9 by ejecting droplets of inks from a plurality of heads 21 to 24 toward the base material 9 while transporting the base material. The base material 9 may also be printing paper or a resin film. The base material 9 may be metallic foil or a glass base material. As shown in FIG. 1, the printing apparatus 1 includes a transport mechanism 10, a printing unit 20, a plurality of sensors 30, a camera 40, and a controller 50.

The transport mechanism 10 is a mechanism that transports the base material 9 in a transport direction conforming to a longitudinal direction thereof. The transport mechanism 10 of the present embodiment includes an unwinding part 11, a plurality of transport rollers 12, and a take-up part 13. The base material 9 is unwound from the unwinding part 11 and transported along a transport path configured using the transport rollers 12. Each of the transport rollers 12 rotates about an axis extending in a direction perpendicular to the transport direction, thereby guiding the base material 9 downstream of the transport path. The base material 9 is hung over the transport rollers 12 while being held under tension. This reduces slacks or wrinkles in the base material 9 during the transport. The transported base material 9 is collected on the take-up part 13. The printing unit 20 is a processing unit that ejects droplets of ink (hereinafter called “ink droplets”) to the base material 9 transported by the transport mechanism 10. The printing unit 20 of the present embodiment has a first head 21, a second head 22, a third head 23, and a fourth head 24. The first head 21, the second head 22, the third head 23, and the fourth head 24 are arranged at intervals in the transport direction of the base material 9. The base material 9 is transported under the four heads 21 to 24 with a printing surface of the base material 9 pointed upward.

Figure 2:
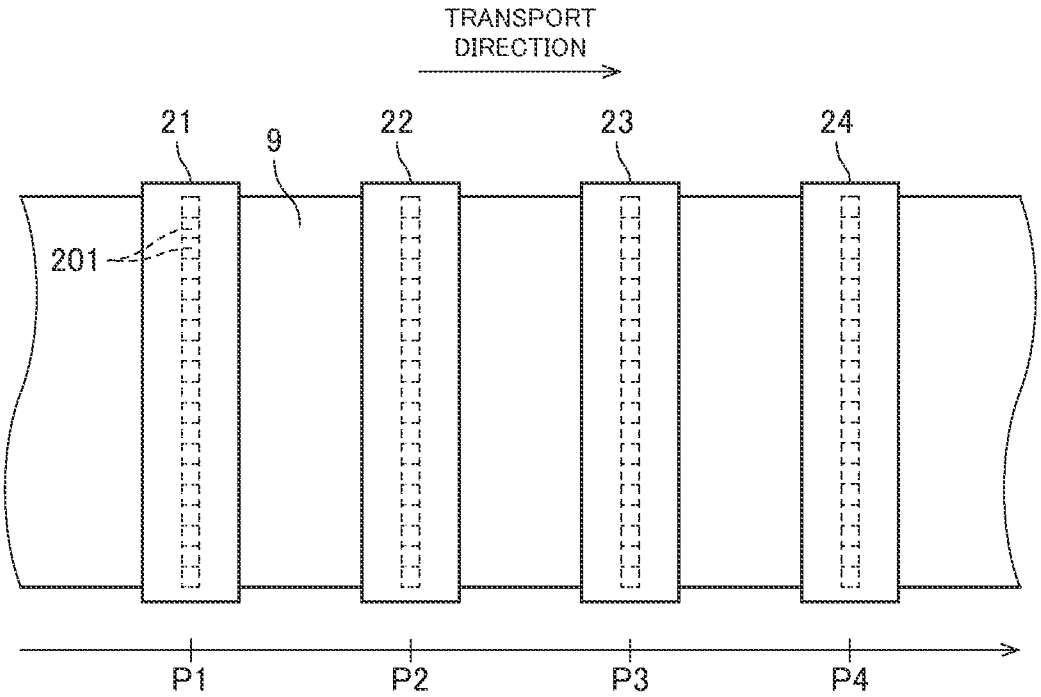
FIG. 2 is a partial top view of the printing apparatus showing a printing unit and its vicinity.

FIG. 2 is a partial top view of the printing apparatus 1 showing the printing unit 20 and its vicinity. As indicated by dashed lines in FIG. 2, each of the heads 21 to 24 has a lower surface provided with a plurality of nozzles 201 arranged parallel to a width direction of the base material 9. The heads 21 to 24 eject ink droplets of respective colors including C (cyan), M (magenta), Y (yellow), and K (black) to become color components of a multi-color image from the nozzles 201 toward the upper surface of the base material 9.

Specifically, the first head 21 ejects ink droplets of the color C to the upper surface of the base material 9 at a first printing position P1 along the transport path. The second head 22 ejects ink droplets of the color M to the upper surface of the base material 9 at a second printing position P2 downstream from the first printing position P1. The third head 23 ejects ink droplets of the color Y to the upper surface of the base material 9 at a third printing position P3 downstream from the second printing position P2. The fourth head 24 ejects ink droplets of the color K to the upper surface of the base material 9 at a fourth printing position P4 downstream from the third printing position P3.

A drying processing unit for drying the inks ejected to the printing surface of the base material 9 may be provided further downstream from the heads 21 to 24 as viewed in the transport direction. For example, the drying processing unit blows a heated gas toward the base material 9 to vaporize solvents in the inks adhering to the base material 9, thereby drying the inks. Meanwhile, the drying processing unit may be a unit for curing or drying the inks by another method such as irradiation with light.

The sensors 30 are measuring instruments for determining the state of the apparatus. The sensors 30 acquire respective measured values at a plurality of measurement places in the printing apparatus 1. Items of measurement by the sensors 30 may include, for example, a rotation speed of a motor for operating the transport mechanism 10, a torque of the motor, rotation speeds of some of the transport rollers 12, tension on the base material 9, vertical displacement of the base material 9 (the amount of displacement occurring in a direction perpendicular to the base material 9), and the position of an edge of the base material 9 in the width direction. The sensors 30 for measuring the same item may be provided at a plurality of positions along the transport path. The sensors 30 measure states at the respective measurement places, and output signals indicating resultant measured values to the controller 50.

The camera 40 is an image capturing unit for capturing an image of the upper surface of the base material 9 having passed through the printing unit 20. The camera 40 is arranged at an image capturing position P5 downstream of the transport path from the printing unit 20 while facing the printing surface of the base material 9. The camera 40 to be used is a line sensor including image capturing elements such as CCDs or CMOSs arranged in a plurality of lines in the width direction, for example. The camera 40 captures an image of the printing surface of the base material 9, thereby acquiring image data about the base material 9 on which a print is already formed. The camera 40 transmits the acquired image data to the controller 50.

Figure 3:
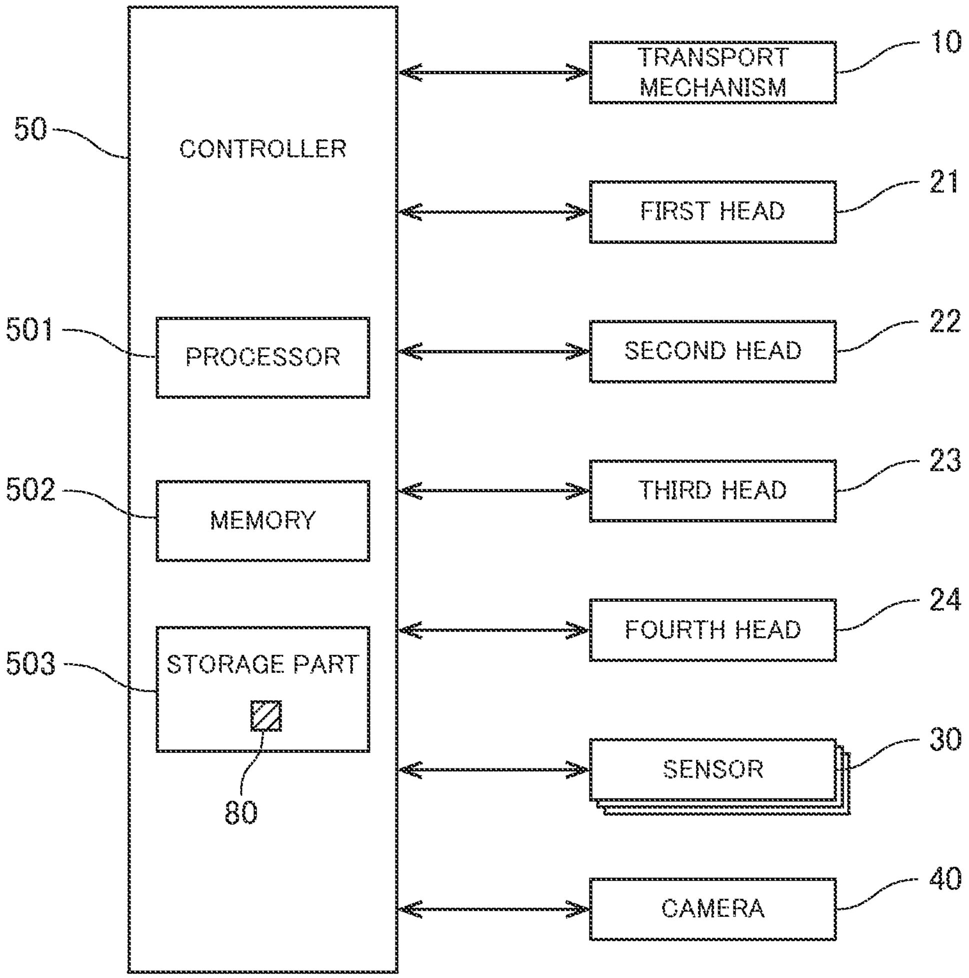
FIG. 3 is a block diagram showing connection between a controller and each part of the printing apparatus.

The controller 50 is an information processing apparatus for controlling the operation of each part of the printing apparatus 1. FIG. 3 is a block diagram showing connection between the controller 50 and each part of the printing apparatus 1. As conceptually shown in FIG. 3, the controller 50 is configured using a computer including a processor 501 such as a CPU, a memory 502 such as a RAM, and a storage part 503 such as a hard disk drive. The storage part 503 stores a computer program 80 for implementation of a printing process. The computer program 80 is read from a computer-readable recording medium such as a CD or a DVD and stored into the storage part 503. Meanwhile, the computer program 80 may be downloaded to the controller 50 via a network.

As shown in FIG. 3, the controller 50 is communicably connected to each of the above-described transport mechanism 10, four heads 21 to 24, plurality of sensors 30, and camera 40. The controller 50 controls the operation of each of these parts by following the computer program 80 and various types of data. By doing so, the printing process proceeds on the base material 9.

<2. Function of Managing State of Apparatus>

In the printing apparatus 1, the four heads 21 to 24 eject ink droplets to print respective single-color images on the upper surface of the base material 9. Then, the four single-color images are superimposed on each other to form a multi-color image on the upper surface of the base material 9. Hence, if mutual misalignment occurs on the base material 9 between the ink droplets ejected from the respective four heads 21 to 24, an image quality of a printed matter is reduced.

Figure 4:
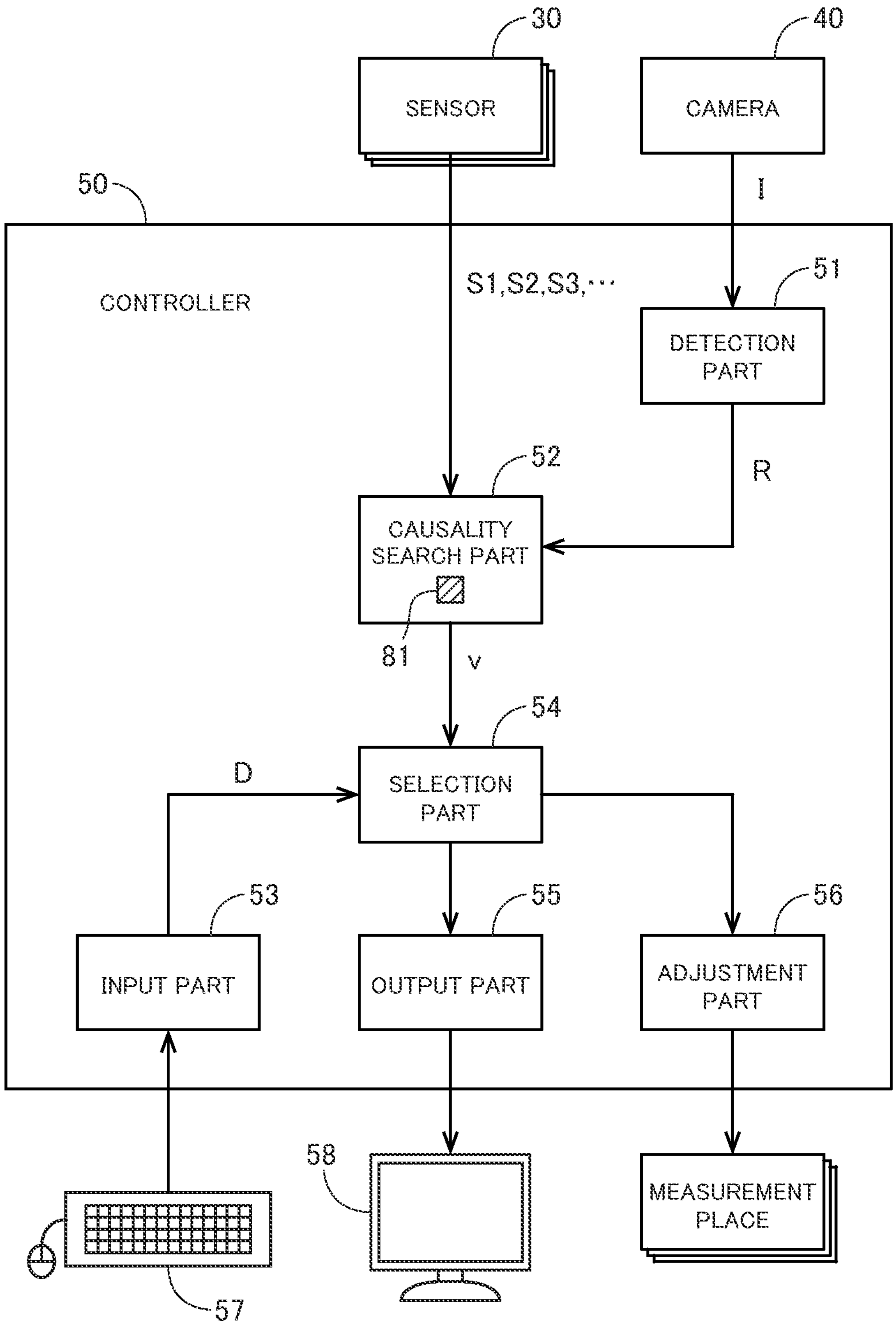
FIG. 4 is a block diagram conceptually showing the function of the controller.

The controller 50 has a function responsive to such misalignment between the ink droplets on the base material 9, and the function is to identify a place to be adjusted and to manage the state of the printing apparatus 1 for alleviating the misalignment. FIG. 4 is a block diagram conceptually showing the function of the controller 50. As shown in FIG. 4, the controller 50 includes a detection part 51, a causality search part 52, an input part 53, a selection part 54, an output part 55, and an adjustment part 56. The detection part 51, the causality search part 52, the input part 53, the selection part 54, the output part 55, and the adjustment part 56 have their respective functions realized by causing the processor 501 of the controller 50 to operate by following the computer program 80.

When the printing apparatus 1 is working, the above-described sensors 30 always measure states at respective measurement places in the apparatus. When the printing apparatus 1 is working, the above-described camera 40 always captures an image of the upper surface of the base material 9 having been subjected to printing. The controller 50 acquires measured values S1, S2, S3, . . . from the sensors 30 and acquires a captured image I from the camera 40. On the basis of the acquired measured values S1, S2, S3, . . . and the acquired captured image I, the controller 50 operates the detection part 51, the causality search part 52, the selection part 54, the output part 55, and the adjustment part 56.

On the basis of the captured image I acquired from the camera 40, the detection part 51 detects the amount of mutual misalignment (hereinafter called a "misregistration amount R") between the ink droplets ejected from the four heads 21 to 24 to the upper surface of the base material 9. The detection part 51 conducts color separation on the captured image I transmitted from the camera 40 into four single-color images of C, M, Y, and K. Then, the detection part 51 detects the amount of mutual misalignment between the four single-color images as the above-described misregistration amount R. For example, the detection part 51 determines the position of each of the ink droplets of the color M, color Y, and the color K relative to the position of the ink droplet of the color C to be the misregistration amount R.

The causality search part 52 acquires the measured values S1, S2, S3, . . . from the sensors 30 and acquires the misregistration amount R from the detection part 51. The causality search part 52 acquires each of the measured values S1, S2, S3, . . . of two or more types and the misregistration amount R as time-series data to change with time.

As shown in FIG. 4, the causality search part 52 has a statistical causality search program 81. The statistical causality search program 81 is stored in the storage part 503 as part of the above-described computer program 80. The statistical causality search program 81 is a program for estimating a causal relationship between a plurality of observed variables. The causality search part 52 uses an LiNGAM (linear non-gaussian acyclic model) program as the statistical causality search program 81, for example. The LINGAM program is a program used for estimating a causal relationship between observed variables on the basis of a model assuming that a linear relationship is defined between a plurality of observed variables and an unobserved coefficient (error variable) to impact on each of the observed variables, and unobserved variables are independent of each other and comply with a non-gaussian continuous distribution.

The causality search part 52 executes the statistical causality search program 81 using the above-described measured values S1, S2, S3, . . . and misregistration amount R as observed variables. By doing so, a causal relationship between the observed variables is estimated.

The causality search part 52 searches for a causal relationship between optional two observed variables belonging to a plurality of observed variables. As descried above, each observed variable is time-series data to change with time. If one observed variable of the two observed variables changes and the other observed variable changes, the causality search part 52 recognizes the one observed variable as a cause and recognizes the other observed variable as an effect. The causality search part 52 sequentially converts the strength of correlation between the two observed variables into a numerical value and calculates the numerical value as a strength v of the causal relationship. The causality search part 52 searches for a causal relationship and calculates the strength v in this way while changing combinations of two observed variables.

Figure 5:
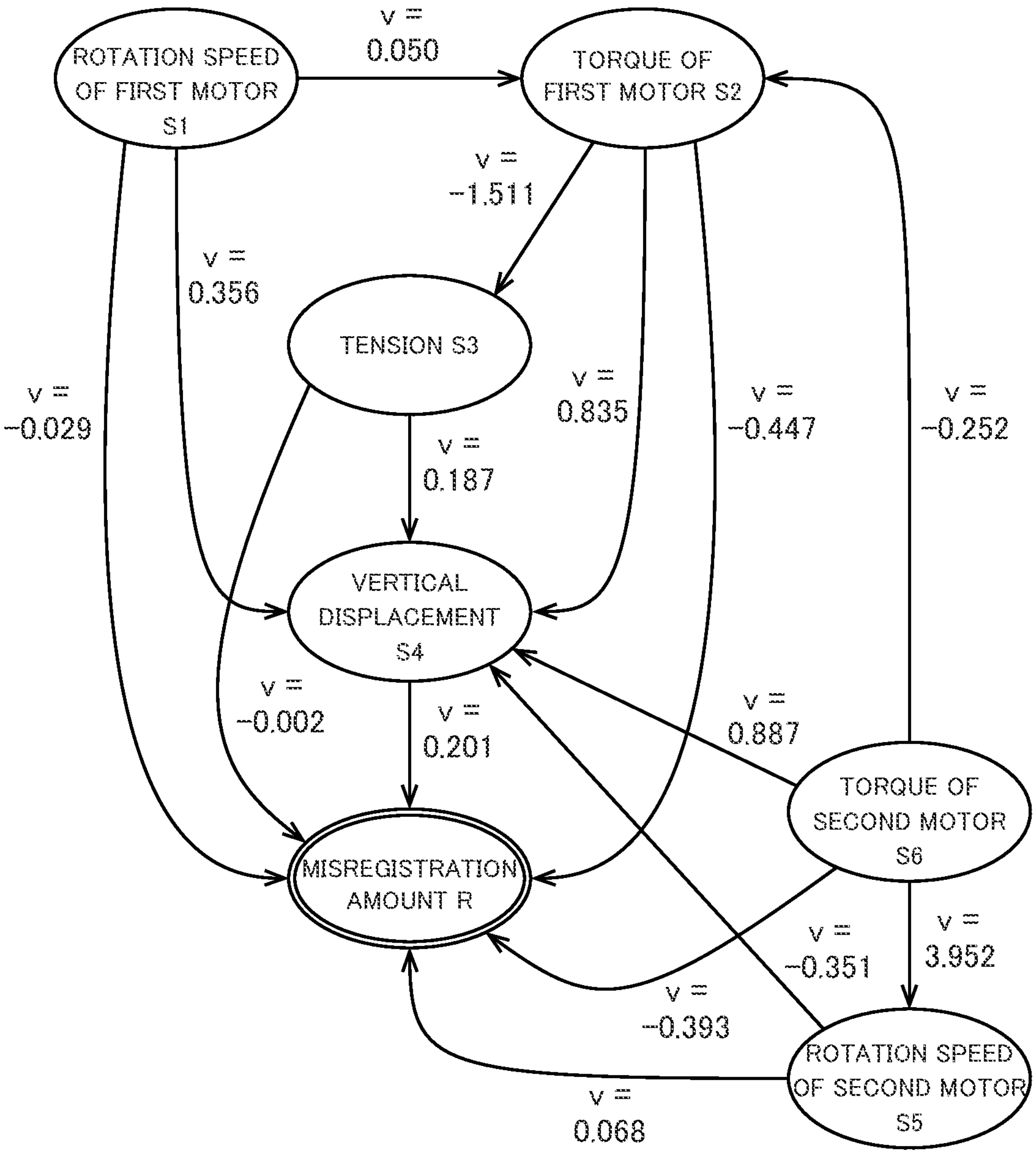
FIG. 5 is an exemplary chart showing a causal relationship between observed variables estimated using a statistical causality search program.

FIG. 5 is an exemplary chart showing a causal relationship between observed variables estimated using the statistical causality search program 81. The illustration in FIG. 5 shows a causal relationship between seven observed variables in total that are six measured values including a rotation speed S1 of a first motor, a torque S2 of the first motor, tension S3 on the base material 9, vertical displacement S4 of the base material 9, a rotation speed S5 of a second motor, and a torque S6 of the second motor, and the misregistration amount R.

An arrow in FIG. 5 shows a causal relationship between two observed variables. A base side of the arrow is an observed variable to exert an impact (cause). A tip side of the arrow is an observed variable to be impacted (effect). A numerical value assigned to the arrow shows the strength v of the causal relationship between the observed variables. As shown in FIG. 5, by running the statistical causality search program 81, the strength v of a causal relationship is output as a numerical value for each arrow.

The input part 53 accepts input of various types of information about the printing process. A user of the printing apparatus 1 inputs various types of information to the input part 53 via an input device 57 such as a keyboard or a mouse or from another information terminal via a communication line. The information input to the input part 53 includes a selection criterion D to be used by the selection part 54 described later. The information input to the input part 53 is stored into the storage part 503

The selection part 54 selects a measurement place to be adjusted from the above-described plurality of measurement places if the misregistration amount R deviates from a preset permissible range. The selection part 54 selects the measurement place to be adjusted on the basis of a causal relationship between a plurality of observed variables and the strength v of the causal relationship output from the causality search part 52, and the selection criterion D input through the input part 53.

Figure 6:
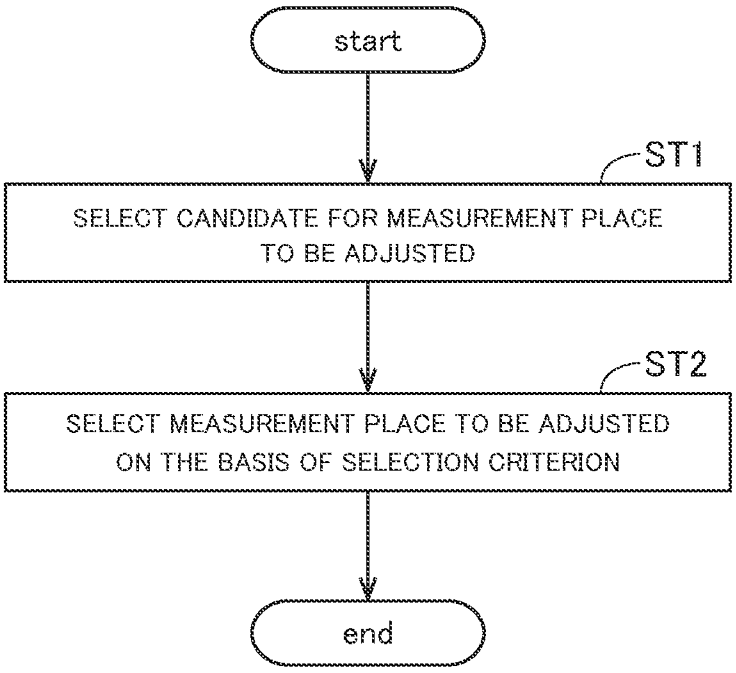
FIG. 6 is a flowchart showing a flow of a selection process performed by a selection part.

FIG. 6 is a flowchart showing an example of a selection process performed by the selection part 54. As shown in FIG. 6, the selection part 54 first selects a candidate for a measurement place to be adjusted from a plurality of measurement places (step ST1). The storage part 503 of the controller 50 contains a threshold for the strength v of a causal relationship stored in advance. Of arrows between corresponding observed variables acquired from the statistical causality search program 81, the selection part 54 takes no account of an arrow with the strength v less than the threshold and selects only an arrow with the strength v equal to or greater than the threshold. By setting the threshold to 0.1 in the flowchart in FIG. 5, for example, a chart such as the one shown in FIG. 7 is obtained in which focus is placed only on arrows each with the strength v equal to or greater than 0.1.

Figure 7:
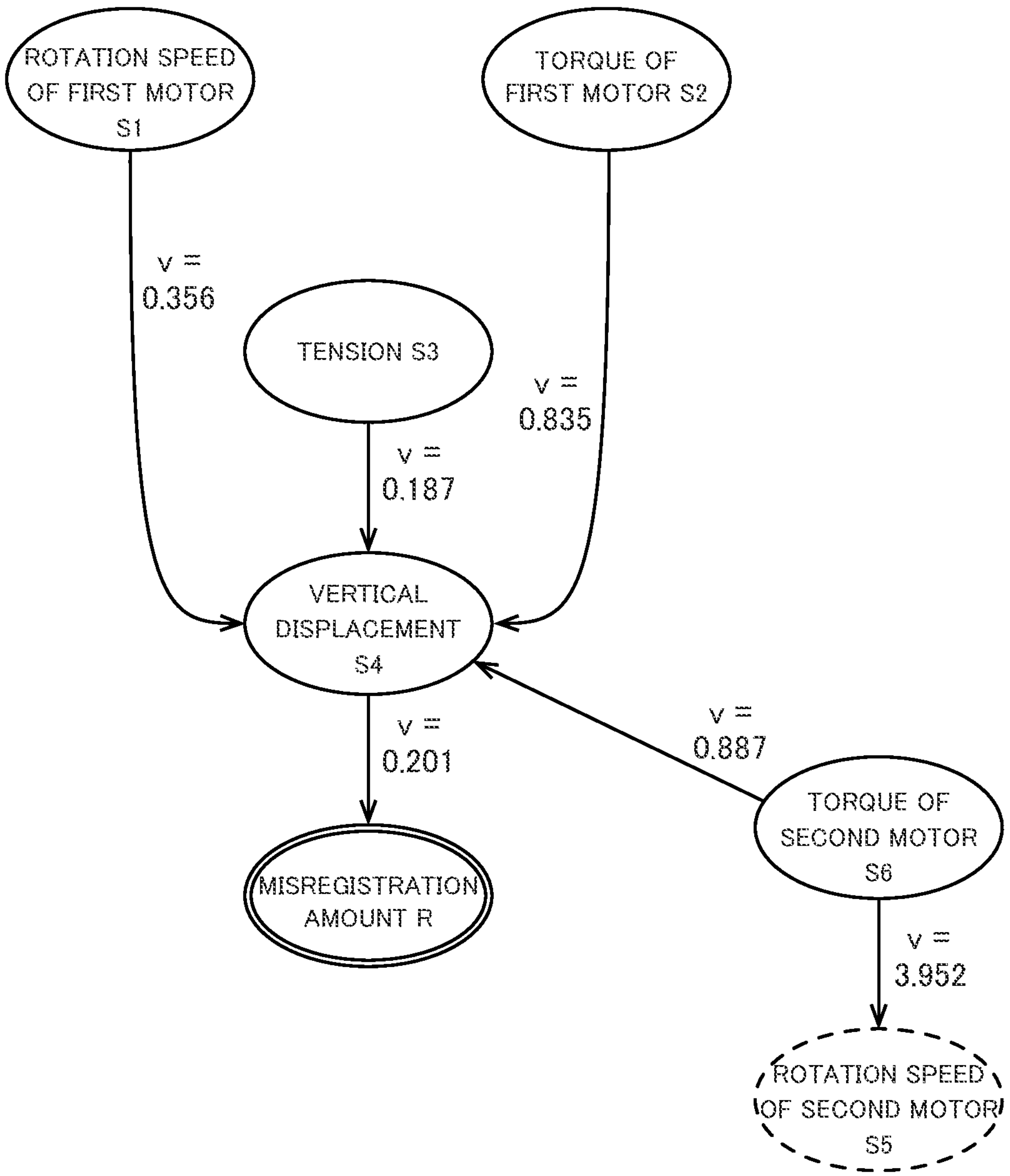
FIG. 7 is an exemplary chart determined by selecting only arrows of equal to or greater than a threshold.

Referring to the chart in FIG. 7, a measurement place of a measured value upstream of an arrow from the misregistration amount R and connected directly or indirectly to the misregistration amount R becomes a candidate for a measurement place to be adjusted. In the illustration in FIG. 7, measurement places of five measured values including the rotation speed S1 of the first motor, the torque S2 of the first motor, the tension S3 on the base material 9, the vertical displacement S4 of the base material 9, and the torque S6 of the second motor become candidates for measurement places to be adjusted. The rotation speed S5 of the second motor is given an arrow not pointed toward the misregistration amount R, so that it does not become a candidate for a measurement place to be adjusted.

Next, the selection part 54 selects a measurement place to be adjusted from a plurality of candidate measurement places on the basis of the above-described selection criterion D (step ST2). In the present embodiment, the selection criterion D is to "preferentially select a measurement place that directly impacts on the misregistration amount R." The illustration in FIG. 7 includes one first measurement place (a measurement place of the vertical displacement S4 of the base material 9) that directly impacts on the misregistration amount R, and four second measurement places (respective measurement places of the rotation speed S1 of the first motor, the torque S2 of the first motor, the tension S3 on the base material 9, and the torque S6 of the second motor) that impact on the misregistration amount R indirectly across the first measurement place. In this case, the selection part 54 selects the first measurement place as a measurement place to be adjusted preferentially to the second measurement places. By doing so, it becomes possible to reduce the misregistration amount R easily only by adjusting the one first measurement place without adjusting the four second measurement places.

The selection criterion D may be a criterion to "preferentially select a measurement place that does not necessitate change of a part for adjustment." In the illustration in FIG. 7, of the measured values at the five measurement places as candidates, it is possible to adjust each of the measurement places of the tension S3 on the base material 9 and the vertical displacement S4 of the base material 9 without changing a part. These measurement places are adjustable by adjusting a dancer roller installed on the transport path of the base material 9, for example. By contrast, the rotation speed S1 of the first motor, the torque S2 of the first motor, and the torque S6 of the second motor each necessitate change of the motor itself on the occurrence of large error from a normal value.

Specifically, in the illustration in FIG. 7, the five measurement places as candidates include two third measurement places (the respective measurement places of the tension S3 on the base material 9 and the vertical displacement S4 of the base material 9) that do not necessitate change of a part for adjustment, and three fourth measurement places (the respective measurement places of the rotation speed S1 of the first motor, the torque S2 of the first motor, and the torque S6 of the second motor) that necessitate change of a part for adjustment.

In this case, the selection part 54 selects the third measurement places as measurement places to be adjusted preferentially to the fourth measurement places. By doing so, it becomes possible to reduce the misregistration amount R by adjusting the third measurement places without changing a part. This allows the printing apparatus 1 to be used continuously while controlling the misregistration amount R within the permissible range without stopping the printing apparatus 1.

The output part 55 outputs information about the measurement place selected by the selection part 54. The output part 55 makes an output by displaying the information about the measurement place to be adjusted on a display 58 connected to the controller 50. The output may be made in a form such as voice output, data transmission to another computer, lighting of a lamp, or printing, for example. A user of the printing apparatus 1 is capable of grasping the measurement place to be adjusted for reducing the misregistration amount R by checking the output information.

If change of a part becomes necessary at the fourth measurement place while the above-described third measurement place is adjusted and the printing apparatus 1 is to be used continuously, the output part 55 may display this indication on the display 58. This allows the user to recognize that change of a part is necessary at the fourth measurement place. As a result, it is possible to conduct work of changing a part at the fourth measurement place by stopping the printing apparatus 1 with favorable timing while using the printing apparatus 1 continuously.

The adjustment part 56 automatically adjusts the measurement place selected by the selection part 54. If the selection part 54 selects the above-described third measurement place as a measurement place to be adjusted, for example, the adjustment part 56 adjusts the third measurement place. More specifically, if the third measurement place is a measurement place of the vertical displacement S4, the adjustment part 56 adjusts tension on the base material 9 corresponding to this measurement place for relieving the vertical displacement S4 of the base material 9. To be more specific, tension on the base material 9 is adjusted using a dancer roller or using a difference in speed between rollers. This allows reduction of an impact to be exerted by this measurement place on the misregistration amount R. As a result, it becomes possible to reduce mutual misalignment between ink droplets ejected to the upper surface of the base material 9 from the respective four heads 21 to 24.

As described above, in the printing apparatus 1, using the measured values S1, S2, S3, . . . and the misregistration amount R as observed variables and using the statistical causality search program 81, a causal relationship between the observed variables is estimated and the strength v of the causal relationship between the observed variables is calculated. If the misregistration amount R deviates from the permissible range, a measurement place to be adjusted is selected from a plurality of measurement places in the printing apparatus 1 on the basis of the strength v of the causal relationship between the observed variables. This allows a measurement place effective in reducing the misregistration amount R to be selected properly. Thus, by adjusting the selected measurement place, it becomes possible to reduce the misregistration amount R easily.

In particular, according to the present embodiment, it is possible for a user to input the selection criterion D intended by the user to the controller 50 in response to a situation of use of the printing apparatus 1. The selection part 54 selects a measurement place to be adjusted on the basis of the strength v of a causal relationship between a plurality of observed variables and the selection criterion D input by the user. By doing so, it becomes possible to determine the measurement place to be adjusted on the basis of the selection criterion D preferable to the user.

According to the present embodiment, if a measurement place selected by the selection part 54 is the third measurement place that does not necessitate change of a part, the adjustment part 56 automatically adjusts the third measurement place. By doing so, it becomes possible to use the printing apparatus 1 continuously while reducing the misregistration amount R without stopping the printing apparatus 1.

3. Modifications

While one embodiment of the present invention has been described above, the present invention is not intended to be limited to the above-described embodiment.

3-1. First Modification

In the above-described embodiment, the selection part 54 selects a measurement place with the strength v of a causal relationship equal to or greater than the threshold, and determines the selected measurement place to be a candidate for a measurement place to be adjusted in step ST1. Meanwhile, the selection part 54 may select a candidate for a measurement place to be adjusted by a different method.

As an example, the occurrence of change in the misregistration amount R comparatively largely changes the strength v of a causal relationship associated with this misregistration amount R. In view of this, in response to deviation of the misregistration amount R from the permissible range, the selection part 54 may select a measurement place as a candidate for a measurement place to be adjusted where the strength v changes at a rate or changes to an amount equal to or greater than a predetermined threshold from a plurality of measurement places. Referring to the chart in FIG. 5, for example, comparison may be made between the strength v of an arrow extending from each measured value in a state before deviation of the misregistration amount R from the permissible range and the corresponding strength v in a state after the deviation, and a measurement place where a measured value measured at this measurement place has the strength v changing at a rate or changing to an amount equal to or greater than the threshold may be determined to be a candidate for a measurement place to be adjusted.

3-2. Second Modification

The causality search part 52 may calculate an impact value about each measurement place that indicates a degree of an impact by each of the measured values S1, S2, S3, . . . on the misregistration amount R on the basis of the strengths v of causal relationships indicated by a plurality of arrows in FIG. 5.

For example, regarding a measured value that directly impacts on the misregistration amount R, the strength v of a causal relationship shown in FIG. 5 may be employed as it is as an impact value. Regarding a measured value that indirectly impacts on the misregistration amount R, an integrated value of the strengths v of a plurality of arrows existing between this measured value and the misregistration amount R may be employed as an impact value. Regarding a measured value that impacts on the misregistration amount R along a plurality of routes, a total value of the strengths v of a plurality of arrows existing between this measured value and the misregistration amount R may be employed as an impact value.

The causality search part 52 may calculate an impact value by a calculation method different from those described above on the basis of the strength v of an arrow output from the statistical causality search program 81.

If the misregistration amount R deviates from the permissible range, the selection part 54 may select a measurement place as a candidate for a measurement place to be adjusted where the impact value is equal to or greater than a predetermined threshold from a plurality of measurement places in step ST1.

3-3. Third Modification

In the above-described embodiment, the selection part 54 determines a measurement place to be adjusted in two steps including the process of narrowing down candidates for measurement places to be adjusted (step ST1) and the process of selecting a measurement place to be adjusted from the narrowed down candidates on the basis of the selection criterion D (step ST2). Meanwhile, the selection part 54 may determine a measurement place to be adjusted by a one-step process. For example, the selection part 54 may select a measurement place to be adjusted on the basis of the strengths v of a plurality of causal relationships without using the selection criterion D designated by a user.

3-4. Fourth Modification

In the example shown in the above-described embodiment, the selection criterion D input through the input part 53 is to "preferentially select a measurement place that directly impacts on the misregistration amount R" or to "preferentially select a measurement place that does not necessitate change of a part for adjustment." Meanwhile, the selection criterion D may be a criterion other than those described above. The selection criterion D is simply required to be a criterion indicating order of precedence in selection between a plurality of measurement places.

3-5. Fifth Modification

In the above-described embodiment, the LINGAM program is given as an example of the statistical causality search program 81. Meanwhile, the statistical causality search program 81 used by the causality search part 52 may be a program other than the LiNGAM program. A technique of the statistical causality search is not limited to a technique using semi-parametric approach such as the LiNGAM but may be a technique using parametric approach or non-parametric approach.

3-6. Other Embodiments

In the above-described embodiment, as shown in FIG. 2, the nozzles 201 are arranged in one line in the width direction at each of the heads 21 to 24. Meanwhile, the nozzles 201 may be arranged in two or more lines at each of the heads 21 to 24.

The printing apparatus 1 of the above-described embodiment includes the four heads 21 to 24. Meanwhile, the number of heads provided at the printing apparatus 1 may be two, three, or five or more. For example, the printing apparatus 1 may include a head for ejecting ink of a particular color in addition to those for ejecting inks of the colors C, M, Y, and K.

All the elements appearing in the above-described embodiment or modifications may be combined, as appropriate, within a range not causing inconsistency.

REFERENCE SIGNS LIST

1 Printing apparatus
9 Base material
10 Transport mechanism
20 Printing unit
21 First head
22 Second head
23 Third head

24 Fourth head
30 Sensor
40 Camera
50 Controller
51 Detection part
52 Causality search part
53 Input part
54 Selection part
55 Output part
56 Adjustment part
57 Input device
58 Display
80 Computer program
81 Statistical causality search program
I Captured image
R Misregistration amount
S1 to S6 Measured value
v Strength
D Selection criterion

The invention claimed is:

1. A printing apparatus comprising:
a transport mechanism for transporting an elongated strip-shaped base material in a longitudinal direction of the base material along a predetermined transport path;
a plurality of heads for ejecting inks to a surface of the base material transported by said transport mechanism;
a plurality of sensors for measuring states at a plurality of measurement places in the apparatus;
a camera for capturing an image of the surface of the base material on a downstream side of said transport path from said plurality of heads; and
a controller communicably connected to said plurality of sensors and said camera, wherein
said controller includes:
a detection part that detects the amount of mutual misalignment between the inks ejected from said plurality of heads to the surface of the base material on the basis of a captured image acquired from said camera;
a causality search part that acquires measured values from said plurality of sensors and acquires said misalignment amount from said detection part, estimates a causal relationship between observed variables using a plurality of said measured values and said misalignment amount as said observed variables and using said statistical causality search program, and calculates a strength of the causal relationship between said observed variables;
a selection part that selects a measurement place to be adjusted from said plurality of measurement places on the basis of a plurality of said strengths if said misalignment amount deviates from a permissible range; and
an input part that accepts input of a selection criterion,
wherein said selection part selects a measurement place to be adjusted on the basis of a plurality of said strengths and said selection criterion input through said input part.

2. The printing apparatus according to claim 1, wherein said plurality of measurement places includes:
a first measurement place that directly impacts on said misalignment amount; and
a second measurement place that impacts on said misalignment amount indirectly across said first measurement place, and
said selection part selects said first measurement place as a measurement place to be adjusted preferentially to said second measurement place.

3. The printing apparatus according to claim 1, wherein said plurality of measurement places includes:
a third measurement place that does not necessitate change of a part for adjustment; and
a fourth measurement place that necessitates change of a part for adjustment, and
said selection part selects said third measurement place as a measurement place to be adjusted preferentially to said fourth measurement place.

4. The printing apparatus according to claim 3, wherein said controller further includes:
an adjustment part that adjusts said third measurement place automatically if said selection part selects said third measurement place.

5. The printing apparatus according to claim 1, wherein said causality search part calculates an impact value about each of said measurement places on the basis of a plurality of said strengths, the impact value indicating a degree of an impact by said measured value on said misalignment amount, and
if said misalignment amount deviates from the permissible range, said selection part selects a measurement place where said impact value is greater than a threshold as a measurement place to be adjusted from said plurality of measurement places.

6. The printing apparatus according to claim 1, wherein if said misalignment amount deviates from the permissible range, said selection part selects a measurement place where said strength changes to an amount or changes at a rate greater than a threshold as a measurement place to be adjusted from said plurality of measurement places.

7. A management method of managing a printing apparatus that ejects inks to a surface of an elongated strip-shaped base material from a plurality of heads while transporting the base material in a longitudinal direction of the base material along a predetermined transport path, the method comprising:
a) a step of measuring states at a plurality of measurement places in said printing apparatus;
b) a step of detecting the amount of mutual misalignment between the inks ejected from said plurality of heads to the surface of the base material;
c) a step of estimating a causal relationship between observed variables using a plurality of measured values acquired in said step a) and said misalignment amount detected in said step b) as said observed variables and using a statistical causality search program, and calculating a strength of the causal relationship between said observed variables; and
d) a step of selecting a measurement place to be adjusted from said plurality of measurement places on the basis of a plurality of said strengths if said misalignment amount deviates from a permissible range,
wherein, in said step d), a measurement place to be adjusted is selected on the basis of a plurality of said strengths and a selection criterion input by a user.

8. The management method according to claim 7, wherein said plurality of measurement places includes:
a first measurement place that directly impacts on said misalignment amount; and
a second measurement place that impacts on said misalignment amount indirectly across said first measurement place, and
in said step d), said first measurement place is selected as a measurement place to be adjusted preferentially to said second measurement place.

9. The management method according to claim 7, wherein said plurality of measurement places includes:

a third measurement place that does not necessitate change of a part for adjustment; and a fourth measurement place that necessitates change of a part for adjustment, and in said step d), said third measurement place is selected as a measurement place to be adjusted preferentially to said fourth measurement place.

10. The management method according to claim 9, further comprising:

e) a step of causing said printing apparatus to adjust said third measurement place automatically if said third measurement place is selected in said step d).

11. The management method according to claim 7, wherein in said step c), an impact value about each of said measurement places is calculated on the basis of a plurality of said strengths, the impact value indicating a degree of an impact by said measured value on said misalignment amount, and in said step d), if said misalignment amount deviates from the permissible range, a measurement place where said impact value is greater than a threshold is selected as a measurement place to be adjusted from said plurality of measurement places.

12. The management method according to claim 7, wherein in said step d), if said misalignment amount deviates from the permissible range, a measurement place where said strength changes to an amount or changes at a rate greater than a threshold is selected as a measurement place to be adjusted from said plurality of measurement places.

* * * * *